(12) United States Patent
Harget et al.

(10) Patent No.: US 6,585,924 B1
(45) Date of Patent: Jul. 1, 2003

(54) HEAT FUSION FITTING

(75) Inventors: David Charles Harget, Wollaton (GB); Jyri Jarvenkyla, Hollola (FI)

(73) Assignee: Uponor Limited, Derbyshire (GB)

( * ) Notice: Subject to any disclaimer, the term of this patent is extended or adjusted under 35 U.S.C. 154(b) by 0 days.

(21) Appl. No.: 09/423,345

(22) PCT Filed: May 21, 1998

(86) PCT No.: PCT/GB98/01368

§ 371 (c)(1),
(2), (4) Date: Mar. 31, 2000

(87) PCT Pub. No.: WO98/53241

PCT Pub. Date: Nov. 26, 1998

(30) Foreign Application Priority Data

May 22, 1997 (GB) .............................. 9710487

(51) Int. Cl.[7] .............................. H05B 3/06; H05B 6/10
(52) U.S. Cl. ..................... 264/230; 428/35.8; 428/36.91
(58) Field of Search ........................ 264/230; 428/35.8, 428/36.91

(56) References Cited

U.S. PATENT DOCUMENTS

| 4,362,684 A | 12/1982 | Thalmann ..................... 264/230 |
| 4,927,184 A | 5/1990 | Bourjot et al. ................. 285/21 |
| 5,030,487 A | 7/1991 | Rosenzweig ................ 428/34.9 |
| 5,338,920 A | * 8/1994 | Okusaka et al. ............. 219/633 |
| 6,149,756 A | * 11/2000 | Jarvenkyla ................ 156/273.9 |

FOREIGN PATENT DOCUMENTS

| EP | 0 513 391 A1 | 11/1992 | ........... F16L/47/02 |
| EP | 0 585 974 A2 | 3/1994 | ........... F16L/47/02 |
| EP | 0 696 156 A1 | 2/1996 | ........... H05B/6/02 |
| GB | 2273260 A * | 6/1994 | ........... B29C/65/36 |
| GB | 2 273 260 | 6/1994 | ........... B29C/65/36 |
| WO | WO 80/02124 | 10/1980 | ........... B29C/27/04 |
| WO | WO 87/06182 | 10/1987 | ........... B29C/65/68 |
| WO | WO 88/00668 | 1/1988 | ........... F16L/47/02 |
| WO | WO 92/15182 | 9/1992 | ........... H05B/6/10 |
| WO | WO 96/28683 | 9/1996 | ........... F16L/47/00 |

* cited by examiner

*Primary Examiner*—Sandra M. Nolan
(74) *Attorney, Agent, or Firm*—Fish & Richardson P.C.

(57) ABSTRACT

A method for the manufacture of a heat fusion fitting, which comprises i) forming a body (1) comprising at least a first layer of a first cross-linked polymeric material, ii) embedding or partly embedding a ferromagnetic heating element (11, 12) in a second polymeric material (13, 14) to form an insert (7, 8), the ferromagnetic heating element (11, 12) having a Curie temperature equal to or greater than the crystalline melting point or softening point of the second polymeric material (13, 14), and iii) assembling the body and the insert (7, 8) to form the fitting.

15 Claims, 2 Drawing Sheets

HEAT FUSION FITTING

This application claims the benefit under 35 USC 371 of PCT/GB98/01368, filed May 21, 1998, which claims priority under 35 USC 119 from United Kingdom application GB 9710487.1, filed May 22, 1997.

This invention relates to heat fusion fittings, and more particularly to an improved method for the manufacture of heat fusion fittings and to new heat fusion fittings and pipe joints produced thereby.

Heat fusion fittings comprising in-line couplings, T-joints, bends, saddle fittings, patches and similar devices have been known for many years. In a typical heat fusion fitting, an electrical resistance heater element is embedded in the inner surface of a sleeve a thermoplastic polymeric material, the sleeve being adapted to fit over a plastic pipe or pipes to be connected. Such fittings are conventionally termed electrofusion fittings.

In an in-line coupling the pipes are inserted into the sleeve into abutment with one another, or into abutment with a stop member, and the heater elements are then energised. Upon heating of the heater elements, the adjacent regions of the sleeve are softened to the point of fusion, whereby the polymeric materials of the pipes and sleeve are fused together.

Essentially the same approach is employed for saddles and patches except that conventional means are employed to hold the elements in intimate contact prior to completion of the fusion process.

U.S. Pat. No. 2,739,829 takes a slightly different approach using induction heating as opposed to resistance heating. Strips of metallic material are placed between a sleeve and pipes to be joined at two locations spaced from the abutment region of the two pipes. A coil connected to an AC source is employed to heat the metallic strips to produce fusion of the polymeric material of the sleeve with the polymeric material of the pipes. Other patents disclosing the use of induction heating in heat fusion fittings include, for example, WO80/02124, EP-A 0572546, EP-A-0513391, and U.S. Pat. No. 4,256,945. The entire disclosures of each and every one of the abovementioned patents are incorporated herein by reference for all purposes.

Heat fusion fittings are conventionally manufactured by injection moulding the entire plastics body of the fitting over the metallic heating element. This is because of the need to locate the heating element or elements accurately within the fitting in order to leave so-called "cold zones" or unheated areas at the ends of the fitting, and adjacent the abutment region of the pipes, in the case of an in-line coupling, to prevent escape of fused polymeric material from the melt fusion regions.

Various efforts have been made to find a more cost effective method for the manufacture of heat fusion fittings, for example, by extruding a tubular polymeric sleeve, heating the sleeve, inserting the electrical resistance heating element into the sleeve on a mandrel which simultaneously expands the sleeve, removing the mandrel and allowing the sleeve to contract around the heating element. Various methods of this type are described in Swiss Patent No 544906, DE-A-2302458, GB-A-2036518 and in U.S. Pat. No. 4,362,684, the entire disclosures of which are incorporated herein by reference for all purposes. In U.S. Pat. No. 4,362,684 it is stated that the simultaneous widening and sliding of the tubular sleeve body onto the heating coil create radial contraction strains in the tubular body which produce welding pressure and facilitate bonding of the pipes. However, in practice, it is found that any such effects are minimal, since the radial contraction strains in the sleeve are dissipated after a very short time, and the fusion process produces only a relatively localised heating such that the main body of the sleeve remains relatively cold and could not possibly contract to produce a welding pressure as suggested in U.S. Pat. No. 4,362,684. Further difficulties also arise in connectorising electrical resistance heating elements inserted into a tubular sleeve body in this way.

For whatever reason, to the best of the Applicants' knowledge, none of the abovementioned methods have been put into practice commercially, and the method of choice for the manufacture of heat fusion fittings remains injection moulding.

In U.S. Pat. No. 5,189,271 there is disclosed a connector comprising a heat shrinkable sleeve heated by a ferromagnetic member which in turn is heated by a varying magnetic field, the ferromagnetic member having a Curie temperature above the shrink temperature of the sleeve.

In a further and separate development, for plastics pipes having improved temperature and pressure resistance, it has been proposed, for example, in U.S. Pat. No. 4,927,184, to use a pipe wall comprising at least a layer of a cross-linked polyolefin material. Pipelines including such pipes also require higher strength fittings, and U.S. Pat. No. 4,927,184 also suggests that the fitting can comprise an outer layer of a cross-linked polyolefin material. It is suggested that if the cross-linked outer layer of the fitting is heated, it will be subject to a contraction, exerting a pressure on the pipes, but this would appear very unlikely, as the cross-linked outer layer is not expanded, and in the heat fusion process it would remain relatively cold. It is also suggested that the fitting can be extruded, but no information is given as to how this production method could be put into practice. The entire disclosure of U.S. Pat. No. 4,927,184 is incorporated herein by reference for all purposes.

According to the present invention, there is provided a heat fusion fitting comprising a body comprising at least an outer layer of cross-linked polymeric material and an induction heating element in contact with the body.

In a first aspect, the invention provides a method for the manufacture of a heat fusion fitting, which comprises:

(i) forming a body comprising at least a first layer of a first cross-linked polymeric material, (ii) embedding or partly embedding a ferromagnetic heating element in a second polymeric material to form an insert, the ferromagnetic heating element having a Curie temperature equal to or greater than the crystalline melting point or softening point of the second polymeric material, and (iii) assembling the body and the insert to form the fitting.

In another aspect, the invention provides a heat fusion fitting comprising a body comprising at least a first layer of a first cross-linked polymeric material, a second layer of a second polymeric material, and a ferromagnetic heating element, the ferromagnetic heating element being embedded or partly embedded in the second layer and having a Curie temperature equal to or greater than the crystalline melting point or softening point of the second polymeric material.

In a further aspect, the invention provides a kit of parts for a heat fusion fitting, the kit of parts comprising a body and an insert, the insert comprising a ferromagnetic heating element embedded or partly embedded in a fusible polymeric material, the ferromagnetic heating element having a Curie temperature equal to or greater than the crystalline melting point or softening point of the polymeric material, and the body being adapted to receive the insert and comprising at least a first layer of a first cross-linked polymeric material.

In the majority of applications, the fitting will, in use, be positioned over a pipe end or spigot to be connected and the invention will henceforth be more particularly described with respect to such an external fitting. In such cases, the first layer of a first cross-linked polymeric material will be an outer layer of the body and the second layer of a second polymeric material will be an inner layer, with the insert being positioned internally of the body. It will be appreciated, however, that the fitting could also be an internal coupler, whereupon the first layer would become the inner layer of the body and the second layer would become the outer layer of the body, the insert then being positioned externally of the body, and that such fittings are also included within the invention.

The body of the fitting will generally be of hollow, tubular construction, although other shapes are possible depending upon the application. The body can be wholly or partly formed of cross-linked polymeric material, but at least an outer layer will be so formed. The body can, for example, be of a dual layer or multiple layer construction, with one or more outer cross-linked layers surrounding one or more uncross-linked layers. A body of dual layer or multiple layer construction can be of particular value in fittings used for connecting pipes of dual or multiple layer construction. Such pipes can comprise, for example, various barrier layers and tie layers. Examples of barrier layers include benzene barrier layers such as nylon and PBT layers, oxygen barrier layers such as EVOH, and water barrier layers such as PVCC. The body of the fitting can also comprise such barrier layers and tie layers as appropriate.

Preferably the body is shaped such that it can be produced by continuous extrusion methods, for example, as disclosed in PCT/EP96/02801, the entire disclosure of which is incorporated herein by reference for all purposes. The body can, as previously stated, be of a tubular construction and may also be extruded with corrugations or ribs on its outer surface. A body with a corrugated outer surface or portion thereof can provide a fitting which is bendable such that a pipe bend can be formed at the fitting. On the other hand, a body with a ribbed outer surface can provide a fitting having improved ring stiffness. An advantage of the present invention is that the body does not need to be produced with moulded-in terminals, which has complicated and increased the cost of prior art processes. Such projecting terminals are also a serious disadvantage if the pipe and fitting are to be used in no-dig applications where the pipe is pulled through the ground, because the projecting terminals add considerable drag resistance.

The first polymeric material is preferably a polyolefin or an olefin copolymer. Suitable polymeric materials include, for example, polymers, copolymers and polymeric blends of ethylene, propylene, butylene, pentene, styrene, butadiene, vinyl alcohols, esters and amides, vinyl halides and similar monomers. Polyethylene, ethylene copolymers, PVC and modified PVC are the preferred first polymeric materials for use in the present invention.

The first polymeric material can be cross-linked, for example, by the use of chemical cross-linking agents, for example, peroxides, silanes and similar materials, or by the use of irradiation, for example, electron beam irradiation, or UV light irradiation, using suitable cross-linking promoters, such as triallyl cyanurate. Chemical cross-linking during extrusion is the preferred route, for example, as disclosed in PCT/EP96/02801.

The first polymeric material is preferably cross-linked to an extent of at least 30%, preferably to an extent of from 30% to 95%. The degree of cross-linking in this specification is expressed as gel content, and measured using the method of ASTM. Cross linking the first layer can, of course, improve the ring strength of the fitting, which may be advantageous for fittings used in the jointing of cross-linked pipes.

In a particularly preferred method according to the invention, the body and the insert are assembled by imparting a degree of dimensional recoverability to the body, such that the body, or a portion thereof, can recover from a larger diameter to a smaller diameter and thereby engage the insert which is positioned in the direction of recovery. In general, the body will recover from a deformed, usually expanded, configuration, although this is by no means essential, and the body can be recoverable due to stresses induced, for example, during extrusion. Where the body recovers from the expanded configuration, the recovery can be elastic recovery, due to elastomeric forces, or heat recovery. In heat recoverability, the body is expanded by a temperature above the crystalline melting point or softening point of the first cross-linked polymeric material and cooled whilst in its expanded configuration. The body then retains its expanded configuration until again heated above the crystalline melting point or softening point of the first polymeric material, whereupon the body will attempt to recover to its original configuration.

Preferably, however, the body is expanded at a temperature below the crystalline melting point or softening point of the first polymeric material, for example, as described in WO93/05332 and WO94/18486, the entire disclosures of which are incorporated herein by reference for all purposes.

The body of the heat fusion fitting can be expanded, for example, using a mandrel, by differential gas pressure, or any other suitable means. Expansion preferably takes place below the crystalline melting point or softening point of the first cross-linked polymeric material and can produce considerable strains in the three-dimensional cross-linked polymeric lattice. Because of the presence of the cross-links, these strains cannot readily be dissipated in the material by relaxation, and thus, after removal of the expansion forces, the body will tend to recover towards its original configuration. The recovery time differs for different polymeric materials, but in the case of cross-linked polyethylene, can take up to several minutes, for example, from about 5–30 seconds, depending upon the diameter/wall thickness ratio.

Care must be taken in expanding the body not to introduce cracks or splits in the body. In general, the expansion of the body is usually in the range of from 15% to 45%. In the case of cross-linked polyolefins, the required expansion can usually be achieved at room temperature, but for certain other polymeric materials gentle heating may be necessary. It is, however, a significant advantage of the present invention that the expansion can be carried out at low temperatures, due to the presence of the cross-links in the first polymeric material.

Not all of the body of the fitting may need to be expanded to allow for insertion of the heating elements. For example, in producing an in-line coupling, it may only be necessary to expand the end sections, because the mid-section, where the pipe ends abut, is preferably a cold spot, without any heating.

Certain polymers, such as PVC, can be made to be recoverable without cross-linking, and these can also be used and expanded to produce the body of the fitting in appropriate cases.

One or more inserts can be used in the fitting and method of the invention. The insert or inserts are formed by embedding or partly embedding a ferromagnetic heating element in a second polymeric material. Suitable ferromagnetic heating elements are disclosed in the patent specifications mentioned hitherto, but preferably the heating element comprises a wire of copper or like conductive material covered with a ferromagnetic material as described in U.S. Pat. No. 4,256,945. The wire can be, for example, formed into a spiral with cross members, a plurality of widely spaced rings also with cross members, a mesh of widely spaced wires forming large squares, or the like. Due to the fact that the ferromagnetic material surrounds the wires in the preferred configuration, demagnetising (edge) effects are not present. Furthermore, the arrangement of a ferromagnetic material on a copper wire behaves as set forth in U.S. Pat. No. 4,256,945, and temperature regulation is excellent and occurs incrementally along the wires so that the temperature is substantially uniform throughout. Preferred ferromagnetic heating elements are described and claimed in WO92/15182. The entire disclosure of WO92/15182 is incorporated herein by reference for all purposes.

Preferably, the ferromagnetic heating element is of a generally tubular construction and is preferably inwardly radially deformable, at least when the second polymeric material has become fused. The ferromagnetic heating element can, for example, be in the form of a radially inwardly deformable wire cage, or a cage of usually corrugated or perforated metal wherein the corrugations or perforations assist inward deformation. Alternatively, the element may be in the form of a so-called "chinese finger" which can elongate with a reduction in diameter. In another possibility, the ferromagnetic heating element can comprise ferromagnetic particles that are dispersed in a polymeric material, for example, as described in U.S. Pat. No. 5,189,271. The fusion of the polymeric material, in this embodiment, permits radial deformation of the ferromagnetic heating element. Inward radial deformation of the ferromagnetic heating element, for example, by recovery of the body of the fitting, can assist in improving the fusion bond by improving mixing in the fusion zone. In addition, if the element is provided with projections, for example, sharp teeth, which can cut into the surface of the pipe to be connected, bonding and pull-out strength can be further improved.

The second polymeric material can comprise any of the polymeric materials listed earlier in connection with the first polymeric material and can be the same or different from the first polymeric material. The second polymeric material can, if desired, have adhesive properties, at least in the molten state, and, for example, polymeric materials comprising hot melt adhesives, for example, polyamides and ethylene/vinyl acetate polymers can also be used. The second polymeric material is preferably uncross-linked, however, or at least is cross-linked to only a small extent, preferably less than 35%, more preferably less than 5%, so that it is still capable of melt fusion. The second polymeric material is preferably uncross-linked polyethylene. The insert is preferably formed by moulding the second polymeric material around the ferromagnetic heating element, so that the ferromagnetic heating element is embedded or partly embedded therein. Other forming methods such as casting or extruding can be used as appropriate. An advantage of the present invention is that the polymeric material of the insert can be chosen to be compatible with the polymeric material of the surface layer of the pipes, whilst the material of the body of the fitting can remain unchanged. This can also enable pipes of dissimilar materials to be joined using a single fitting and an appropriate choice of polymeric material inserts. For example, the fitting can be used to join together cross-linked polyethylene, PVC and modified PVC pipes using the appropriate polymeric material inserts. The ferromagnetic heating element is preferably wholly embedded in the second polymeric material, so that it is protected from damage when a pipe is inserted into the fitting.

The moulding of the second polymeric material around the ferromagnetic heating element provides a reservoir of fusible material adjacent the heating element in preparation for the fusion step. The second polymeric material can also be shaped so that the insert is an accurate dimensional fit in the body of the fitting, and the moulded material can be extended axially of the ferromagnetic heating element to form in-situ pre-moulded "cold zones" to contain the flow of melt from the melt region.

In a further embodiment, the second polymeric material can also have end sections moulded to perform other functions. In addition to, or instead of, providing "cold zones", the end sections of the moulded second polymeric material can, for example, be provided with internal grooves for accommodating sealing means, for example, resilient gaskets or O-rings. Such gaskets or O-rings also have the advantage that they can help to prevent particles of dust or other contaminants from entering the melt region when a pipe is inserted into the fitting. Preferably, the inner diameter of the insert is substantially equal to the outer diameter of the end section of the pipe to be connected, with as small a clearance as possible consistent with the ability to push the pipe into the fitting by hand against any frictional resistance. The end section of the pipe can of course have a reduced diameter, allowing the outer diameter of the fitting to be reduced, for example, in no-dig applications. The inner diameter of the insert can also be varied along its length, or two inserts used of different diameter, where pipes of different outer diameter are to be connected. This can, for example, enable the fitting to be used as a reducer.

The ferromagnetic heating element preferably has a Curie temperature that is at least 10° C., more preferably from 20° C. to 80° C. greater than the crystalline melting point or softening point of the second polymeric material.

In a preferred method according to the invention, once the body, or the appropriate regions thereof, have been expanded, it is merely necessary to bring the body into the desired location with respect to the insert, and allow the expanded body to recover into contact with the insert. Preferably the dimensions of the body and the insert are such that there is still some unresolved recovery in the body after it has contacted the insert. This unresolved recovery, which, due to the presence of the cross-links, cannot readily be dissipated by the body, enables the body to grip the insert tightly, and, when the insert is softened by heating, the unresolved recovery forces can exert a pressure on the melt region, thereby improving the quality of the fusion joint. It should be pointed out that this unresolved recovery is not solely due to thermal contraction, or orientation effects, though these may play a part, but to a deformation and strain of the cross-linked polymer structure, which provides a more permanent and reliable recovery force.

Whilst in general it is preferred that the insert produces a fusion bond to the outer surface of the pipe and the inner surface of the body of the fitting, this may not be necessary in all circumstances. Thus, for example, it may not be necessary for the insert to make a full fusion bond to the inner surface of the body of the fitting where the body exerts a significant recovery force on the melt region. In this case, the recovery force may be sufficient to provide the necessary joint tightness, assisted by the end regions of the body, which can be arranged to shrink around the insert, thereby preventing the insert from being extracted from the body of the fitting.

Certain preferred embodiments of the invention will now be described, by way of example only, with reference to the accompanying Drawings in which.

Figure 1:
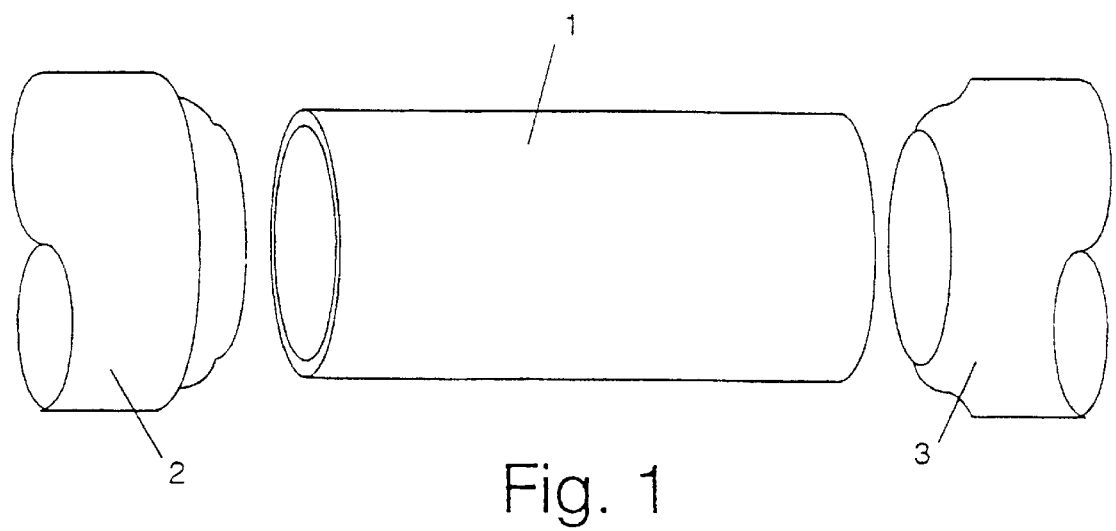
FIG. 1 shows a perspective view of a body of an heat fusion coupler, with expansion mandrels positioned prior to the expansion step.
Figure 2:
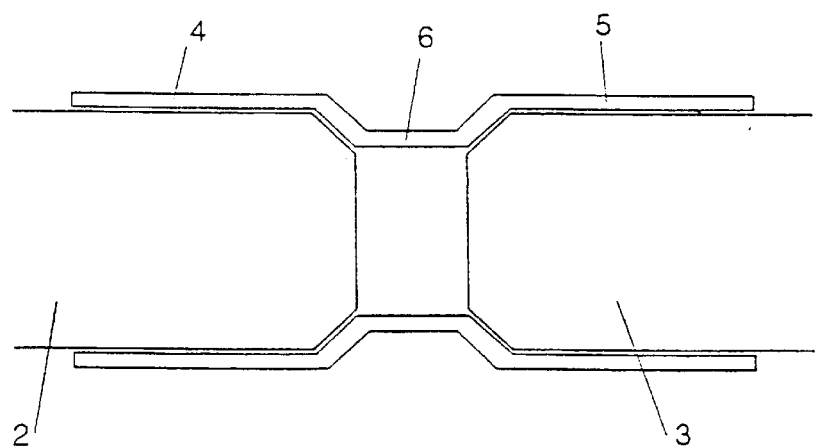
FIG. 2 shows a sectional side elevation of the body of FIG. 1 with its end regions expanded by the mandrels.

Referring firstly to FIG. 1, the body 1 comprises an extruded tubular member formed by cutting to length an extruded tube of cross-linked polyethylene. The mandrels 2,3 are positioned at the ends of the body 1, and are moved axially towards the body in order to expands the end regions 4,5, leaving an unexpanded central region 6.

Figure 3:
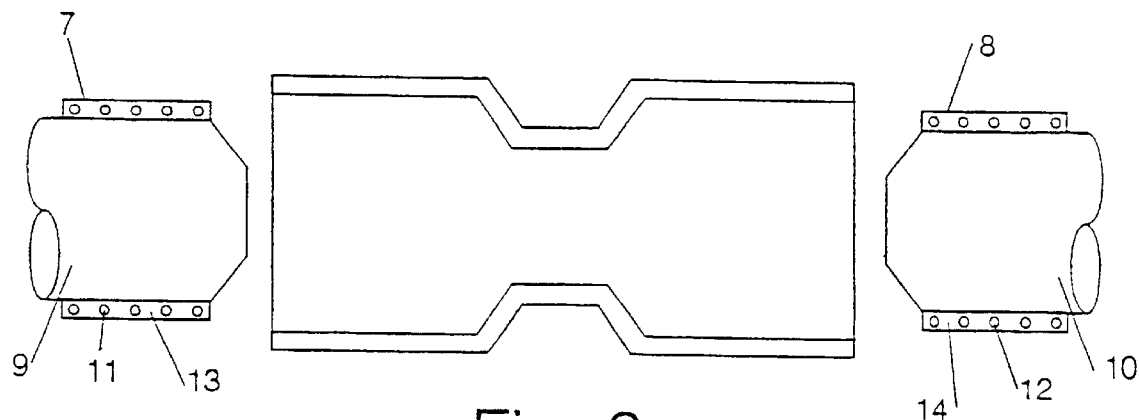
FIG. 3 shows a sectional side elevation of the expanded body of FIG. 2 with the inserts positioned for insertion.

In FIG. 3 the mandrels have been removed. The expanded body is dimensionally unstable and will attempt to revert to its unexpanded state at room temperature.

This process is, however, time dependent, and can take up to several minutes. Whilst the body is still expanded, inserts 7,8 are brought into register on support members 9,10 as shown in FIG. 3. Each of the inserts 7,8 comprises a coil of ferromagnetic heating wire 11,12 embedded in a fusible uncross-linked polyethylene matrix 13,14.

Figure 4:
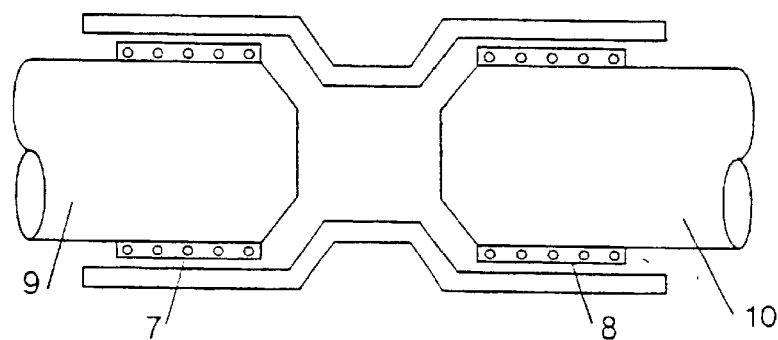
FIG. 4 shows a sectional side elevation of the body of FIG. 3 with the inserts positioned in the expanded ends.
Figure 5:
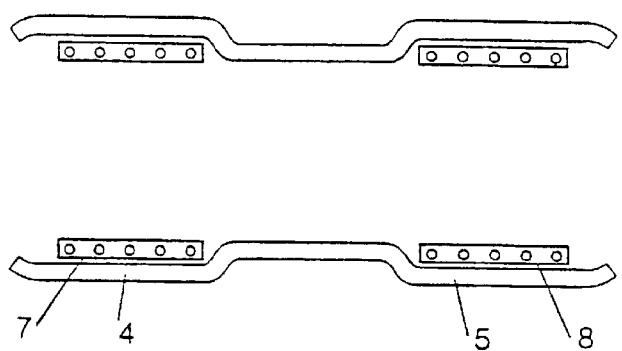
FIG. 5 shows a sectional side elevation of a completed heat fusion coupler according to the invention.

FIG. 4 shows the inserts 7,8 in position in the expanded body, still mounted on the support members 9,10. As the body contracts around the inserts, the support members are removed, leaving the inserts firmly held by the body, as shown in FIG. 5. Further contraction of the body is prevented by the inserts, but the recovery stresses in the body remain unresolved. Thus, when the heat fusion coupler is in use, and the heating elements 11,12 are activated, the body end regions 4,5 continue to exert a recovery force on the fused uncross-linked polyethylene matrices 13,14 and helps to eliminate void formation and improve the strength of the fusion bond.

It will be appreciated that whilst the support members 9, 10 are indicated as being removed in FIG. 5, in a still further embodiment, the members 9,10 could be spigot members or pipe members which are to be joined using the heat fusion coupler. In such a case, the members 9,10 would of course remain in place, whereupon, after contraction of the body, the heating elements 11,12 are activated in order to make a fusion between the Polyethylene matrices 13,14 and the members 9,10.

The reader's attention is directed to all papers and documents which are filed concurrently with or previous to this specification in connection with this application and which are open to public inspection with this specification, and the contents of all such papers and documents are incorporated herein by reference.

All of the features disclosed in this specification (including any accompanying claims, abstract and drawings), and/or all of the steps of any method or process so disclosed, may be combined in any combination, except combinations where at least some of such features and/or steps are mutually exclusive.

Each feature disclosed in this specification (including any accompanying claims, abstract and drawings), may be replaced by alternative features serving the same, equivalent or similar purpose, unless expressly stated otherwise. Thus, unless expressly stated otherwise, each feature disclosed is one example only of a generic series of equivalent or similar features.

The invention is not restricted to the details of the foregoing embodiments. The invention extends to any novel one, or any novel combination, of the features disclosed in this specification (including any accompanying claims, abstract and drawings), or to any novel one, or any novel combination, of the steps of any method or process so disclosed.

What is claimed is:

1. A method for the manufacture of a heat fusion fitting, which comprises:
   i) forming a body of hollow, tubular construction comprising at least a first layer of a first cross-linked polymeric material,
   ii) forming an insert by moulding a second polymeric material around a ferromagnetic heating element so that the ferromagnetic heating element is embedded or partly embedded therein, the moulded material extending axially of the ferromagnetic heating element to form in-situ pre-moulded "cold zones" to contain the flow of melt from a melt region, the ferromagnetic heating element having a Curie temperature equal to or greater than the crystalline melting point or softening point of the second polymeric material, and
   iii) assembling the body and the insert to form the fitting by expanding the body at a temperature below the crystalline melting point or softening point of the first polymeric material to impart a degree of dimensional recoverability to the body, such that the body, or a portion thereof, can recover from a larger diameter to a smaller diameter and thereby engage the insert which is positioned in the direction of recovery.

2. A method according to claim 1, in which the first layer is an outer layer of the body and the insert is positioned internally of the body.

3. A method according to claim 1, in which the body is of dual layer or multi-layer construction, and at least one of the layers is a barrier layer.

4. A method according to claim 1, in which the body has either corrugations or ribs on its outer surface.

5. A method according to claim 1, in which the first polymeric material is polyethylene, an ethylene copolymer, PVC, or a modified PVC.

6. A method according to claim 1, in which the first polymeric material is cross-linked to an extent of from 30% to 95%.

7. A method according to claim 2, in which the fitting is an in-line coupling and only the end sections of the coupling are expanded.

8. A method according to claim 2, in which the expansion of the body is in the range of from 15% to 45%.

9. A method according to claim 1, in which the ferromagnetic heating element comprises a wire of conductive material covered with a ferromagnetic material.

10. A method according to claim 1, in which the ferromagnetic heating element is of generally tubular construction and is inwardly radially deformable.

11. A method according to claim 1, in which the second polymeric material is uncross-linked polyethylene.

12. A method according to claim 2, in which the moulded material is extended axially of the ferromagnetic heating element to form end sections adapted to perform further functions.

13. A method according to claim 1, in which the moulded material is extended axially of the ferromagnetic heating element to form end sections which are provided with internal grooves for accommodating sealing means.

14. A method according to claim 1, in which the ferromagnetic heating element has a Curie temperature of from 20° C. to 80° C. greater than the crystalline melting point or softening point of the second polymeric material.

15. A method according to claim 1, in which the dimensions of the expanded body and the insert are such that there is still some unresolved recovery in the body after it has recovered into contact with the insert.

* * * * *